US008650344B2

(12) United States Patent
Wu (10) Patent No.: US 8,650,344 B2
(45) Date of Patent: Feb. 11, 2014

(54) METHOD FOR OPERATING KVM SWITCH WITH INDEPENDENT ON-SCREEN DISPLAY AND CONTROL CHANNELS

(75) Inventor: Hung-June Wu, Taipei Hsien (TW)

(73) Assignee: June-On Technology Co., Ltd., New Taipei (TW)

( * ) Notice: Subject to any disclaimer, the term of this patent is extended or adjusted under 35 U.S.C. 154(b) by 172 days.

(21) Appl. No.: 13/408,513

(22) Filed: Feb. 29, 2012

(65) Prior Publication Data
US 2012/0162519 A1 Jun. 28, 2012

Related U.S. Application Data

(63) Continuation-in-part of application No. 12/176,426, filed on Jul. 21, 2008, now abandoned.

(51) Int. Cl.
*G06F 3/00* (2006.01)
*G06F 13/12* (2006.01)
*G06F 13/38* (2006.01)

(52) U.S. Cl.
USPC ................................. 710/62; 710/8

(58) Field of Classification Search
None
See application file for complete search history.

(56) References Cited

U.S. PATENT DOCUMENTS

| 6,345,323 B1 | 2/2002 | Beasley et al. |
| 6,671,756 B1 | 12/2003 | Thomas et al. |
| 2004/0075638 A1 | 4/2004 | Han |
| 2006/0114234 A1 | 6/2006 | Chiang |
| 2006/0244863 A1 | 11/2006 | Baikie et al. |
| 2007/0022176 A1 | 1/2007 | Kobayashi |
| 2007/0088841 A1 | 4/2007 | de Kerf |
| 2007/0152972 A1 | 7/2007 | Zhang |
| 2007/0236481 A1 | 10/2007 | Liu |
| 2007/0257883 A1 | 11/2007 | Ke |
| 2008/0007549 A1 | 1/2008 | Huang et al. |
| 2008/0036741 A1 | 2/2008 | Hsieh et al. |
| 2008/0062121 A1 | 3/2008 | Huang et al. |
| 2008/0250350 A1 | 10/2008 | Chen et al. |
| 2009/0043928 A1 | 2/2009 | Lou |
| 2009/0094395 A1 | 4/2009 | Shen |

OTHER PUBLICATIONS

"Single-Channel Monochrome On-Screen Display with Integrated EEPROM" by Maxim, Rev 0, copyright 2007, Maxim Integrated Products, 43 pages.

*Primary Examiner* — Kris Rhu
(74) *Attorney, Agent, or Firm* — Chun-Ming Shih; HDLS IPR Services (57) ABSTRACT

A method for operating a KVM switch with independent OSD and control channels comprises the steps of: receiving a functional instruction from the operation and control device; outputting a switch signal to turn off the picture of the selected computer, and starting the channel for the OSD signals; retrieving a pre-stored OSD background picture, and outputting the OSD background video signal and the control command to the OSD processing chip and OSD video switching circuit, and displaying via the monitor; inputting a functional instruction to select an OSD operation picture; outputting the selected OSD operating picture to the OSD processing chip and then to the monitor; inputting a functional instruction to stop the OSD operation; the OSD control system unit enabling the OSD video switching circuit to turn off the channel of the OSD signals, and controlling to switch back to the picture of the computer.

10 Claims, 7 Drawing Sheets

METHOD FOR OPERATING KVM SWITCH WITH INDEPENDENT ON-SCREEN DISPLAY AND CONTROL CHANNELS

CROSS REFERENCE TO RELATED ART

This application is a Continuation-In-Part of application Ser. No. 12/176,426, filed on Jul. 21, 2008, now abandoned. The patent application identified above is incorporated here by reference in its entirety to provide continuity of disclosure.

BACKGROUND OF THE INVENTION

1. Field of the Invention

The invention relates to a method for operating KVM switch with independent on-screen display (OSD) and control channels, particularly to the method that uses an OSD unit to process OSD signals and an OSD video switching circuit to switch the ON/OFF of the display of the OSD synchronization signal, OSD menu video signal and OSD background video signal, keeping display settings unchanged on the OSD picture and facilitating OSD related operations.

2. Description of the Related Art

When a computer fails to meet operational requirements due to working or updating factors, adding a computer or continuing to use the replacement machine is the most common solution; but under the condition of limited space and insufficient budgets, these ideas can seldom be achieved in the past. However, thanks to rapid development of electronics and information technology, now two (or more) computers, whether new or old, can share one keyboard, mouse, monitor and even loudspeaker, microphone and any peripheral simply through connecting in series to a KVM switch. Thus, users can not only have more space to work more efficiently, but also reduce the cost in purchasing peripherals.

KVM switch is a switch that integrates keyboard, video and mouse. In other words, KVM switch allows users to switch displays among multiple computers merely with a single set of keyboard, video and mouse. This not only helps reduce the number of operating equipments in the multi-computer environment, but also allows the user to manage different computers or servers synchronously through rapid switching from one computer to another, without interrupting operations of the computer from which the switching is performed, thus making operations easier.

Figure 6:
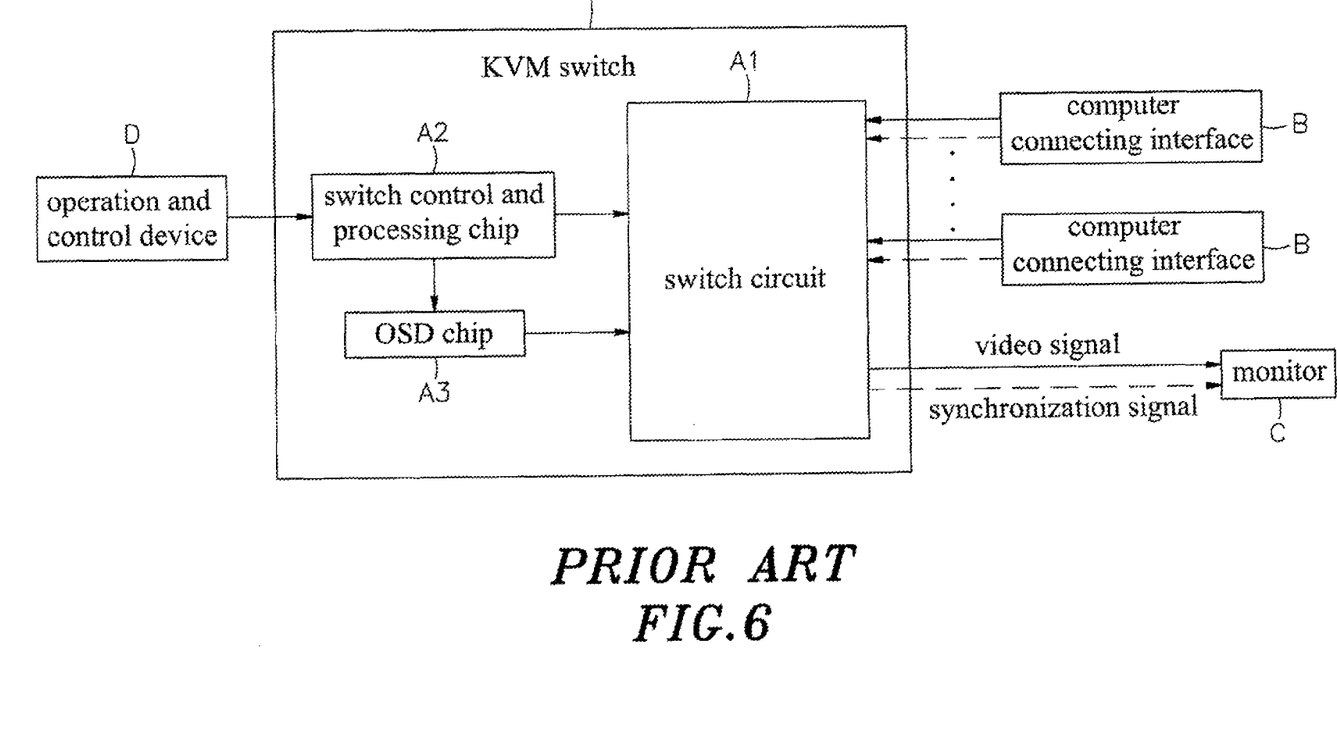
FIG. 6 is a block diagram of a conventional KVM switch.
Figure 7:
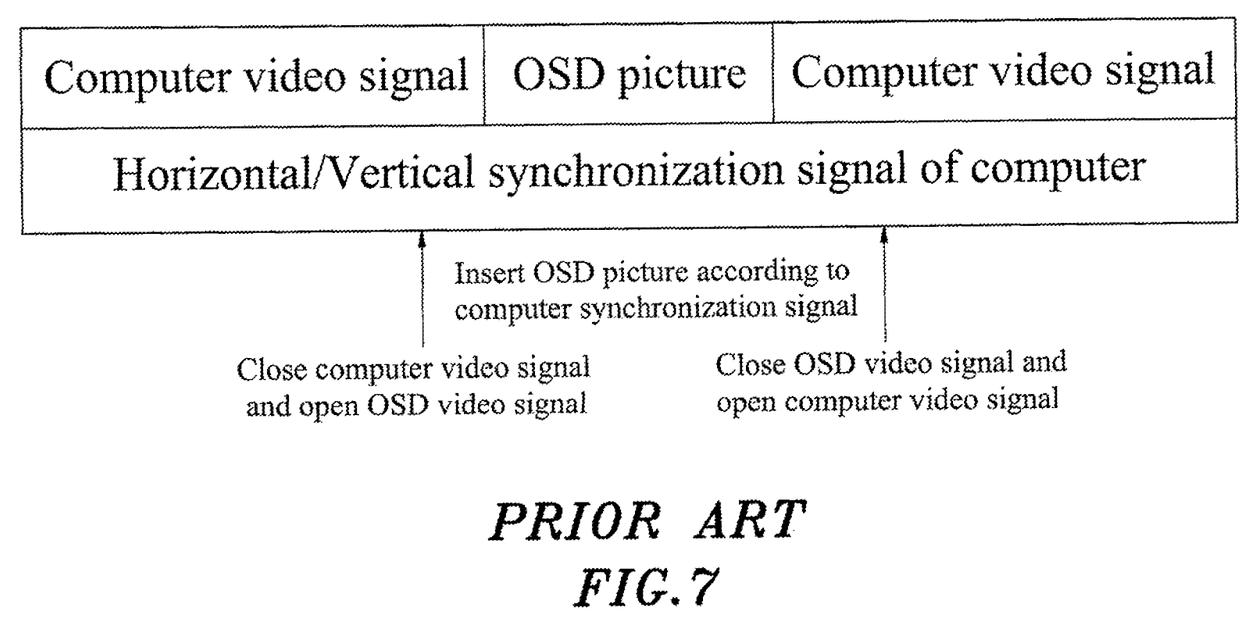
FIG. 7 is a schematic diagram of the conventional KVM switch in use.

As KVM switch becomes popular, manufacturers have developed KVM switches with on-screen display (OSD) functionality, which display a control panel on the monitor to facilitate operations and adjustments by users, as shown in FIGS. 6 and 7. For the KVM switch with usual OSD functions, OSD video signal are inserted into horizontal/vertical signal of computer video, so as to make the OSD operation picture directly overlap on the original computer picture. However, when the display settings of computers are different, the size or location of characters of the OSD operation picture will vary from one computer to another. This not only affects the degree of comfort of the user while viewing, but also makes operations using mouse or touch screen more troublesome and difficult. Besides, usually it is easy to form an interface channel into which unauthorized users can intrude through the OSD operation interface. As long as the unauthorized users intrude into any part of the MCU, switching circuit, firmware program area or data storage area, they can intrude into any externally connected computer due to connectivity of KVM blocks and connection with external computers, thus resulting in poor security and safety protection functions.

A KVM switch A comprises a switch circuit A1, a switch control and processing chip A2 and an OSD chip A3. The switch circuit A1 is connected with a plurality of computer connecting interfaces B and a monitor C, while an operation and control device D is connected with the switch control and processing chip A2. Since the switch control and processing chip A2 not only performs various operation functions of the KVM switch, but also needs to perform processing and calculation of the OSD display functions. However, the size of the program memory of the switch control and processing chip A2 and the number of the I/O pins will limit the OSD display functions. Moreover, due to increasing execution burden and the share of resources of the switch control and processing chip A2, the on-screen display functions are limited.

Basically, for the KVM switch with OSD functions available in the market, there is a main control unit inside for performing control. When switched to display the OSD operation picture, the OSD operation picture (On-Top) is directly displayed on the screen and overlaps on the original computer picture. There are problems and disadvantages with the displayed OSD operation mode and picture as follows:

(1) because OSD picture depends on the display setting parameters of a computer connected by the KVM switch, and when the connected computers have different display setting parameters, the OSD display characters change with the setting parameters of the computers and produce a deviating phenomenon of display characters, image and location, thus resulting in poor visual adaptation of consumers. Furthermore, for the deviation of the OSD display position is not fixed, the operator cannot achieve the function of controlling with mouse or controlling with touch panels.

(2) since the switch control and processing chip A2 of the KVM switch is also used to assist in processing the OSD functions, it will have impact on the size of the program and data memory used by the micro-processor chip of KVM switch and on the number of I/O pins, and will increase the operation burden of the switch control and processing chip A2 and occupy the limited resources, without making full use of the functions of the switch control and processing chip A2 and OSD operation pictures. Moreover, when online update is required, only the original OSD basic operation functions of KVM switch can be updated in a limited scope due to the above limitations in hardware structure (reduction in memory capacity available and the number of I/O pins), and it is impossible to update functions of KVM switch and OSD system effectively.

(3) since the OSD system and KVM switch share the same switch control and processing chip A2 and other resources and cannot separate all computers controlled by them, the standards of IT security required by the secure KVM switch cannot be reached, such as the requirements for the general standards of NIAP and the human interface device.

(4) the OSD system and KVM switch share the same switch control and processing chip A2, while the switch control and processing chip A2 has a plurality of pins, and the switch control and processing chip A2 occupies memory and hardware pins in order to process a large number of signals and transmit different signals through a plurality of pins respectively, and it will result in higher prices of the switch control and processing chip A2 and increase the cost of KVM switch accordingly.

The above-mentioned problems and disadvantages of a conventional KVM switch are just what the inventor and others involved in this field need urgently to improve.

SUMMARY OF THE INVENTION

In view of the aforesaid problems and disadvantages, the inventor has collected related information, conducted assessments and taken considerations in many aspects, and based on many years of his own experience in this field, has finally invented the method for KVM switch with independent OSD and control channels.

The primary object of the invention is to provide a method for operating a KVM switch with independent on-screen display (OSD) and control channels through one or more operation and control devices, the KVM switch comprising a switch circuit, an OSD control system unit and an OSD unit, the switch circuit comprising a computer video switching circuit for receiving video signals and synchronization signals from a plurality of computers and a switch control and processing chip for receiving the video signals and synchronization signals from the computer video switching circuit and calculating, processing and transmitting the video signal and the synchronization signal of the selected computer to the computer video switching circuit, the OSD control system unit comprising an OSD control system chip which receives at least one functional instruction from the operation and control devices, converts the functional instruction to control command and transmits the control command to the switch circuit and the OSD unit, the OSD unit comprising an OSD video switching circuit and an OSD processing chip, the OSD processing chip receiving the control command and a background video signal from the OSD control system unit, calculating, processing and generating an OSD synchronization signal and an OSD menu video signal, and transmitting the OSD synchronization signal, the OSD image signal and the OSD background image signal to the OSD video switching circuit, the OSD video switching circuit performing the ON and OFF switching processing for the output of the OSD synchronization signal, OSD menu video signal and OSD background video signal for displaying at a monitor, the method comprising the steps of:

(a) the switch control and processing chip of the switch circuit of the KVM switch receiving a functional instruction or call from the operation and control device;
(b) the switch control and processing chip of the KVM switch handing the OSD relevant control power over to the OSD control system unit, and then the OSD control system unit outputting switch signals to turn off the picture of the video signal and synchronization signal of the selected computer and starting the channel for the OSD synchronization signal, OSD menu video signal and OSD background video signal;
(c) the OSD control system unit of the KVM switch retrieving a pre-stored OSD background picture;
(d) the OSD control system unit outputting the pre-stored OSD background video signal and the control command to the OSD processing chip of the OSD unit, and the OSD processing chip and the OSD video switching circuit transmitting the OSD background video signal, the OSD menu video signal and the OSD synchronization signal to the monitor for displaying;
(e) the operation and control device inputting a functional instruction to select an OSD operation picture;
(f) outputting the selected OSD operating picture to the OSD processing chip, and then transmitting it to the monitor;
(g) the operation and control device inputting a functional instruction to the OSD control system chip of the OSD control system unit to control the OSD processing chip to stop the OSD operation and exit from the OSD background picture;
(h) the OSD control system unit enabling the OSD video switching circuit to turn off the channel of the OSD synchronization signal, the OSD menu video signal and the OSD background video signal, and handing the control power back to the switch control and processing chip of the switch circuit of the KVM switch, and then the switch control and processing chip controlling the computer video switching circuit to switch back to the picture of the video signal and synchronization signal of the computer.

According to the present invention, the execution burden of the switch control and processing chip is reduced. Besides, as the OSD control system unit is further supplemented with OSD functions in extendibility or online update, it not only strengthens the control function of the OSD system, but also makes the OSD functions more complete and overcomes the problem of intrusion by unauthorized users through externally connected computers, thus achieving reliable safety protection and security functions. When users perform OSD control through the operation and control device, the OSD picture switched to any computer calling for display can keep the size and location of the picture consistent, so as to facilitate users to watch. The operation and control device, such as touch screen or mouse, can be set as the controlling interface of OSD.

DETAILED DESCRIPTION OF THE PREFERRED EMBODIMENT

To achieve the aforesaid objects and functions as well as the techniques adopted in the present invention and its fabrication, examples of the preferred embodiments of the present invention are given below to illustrate its features and functions in detail by referring to the accompanying drawings.

Figure 1:
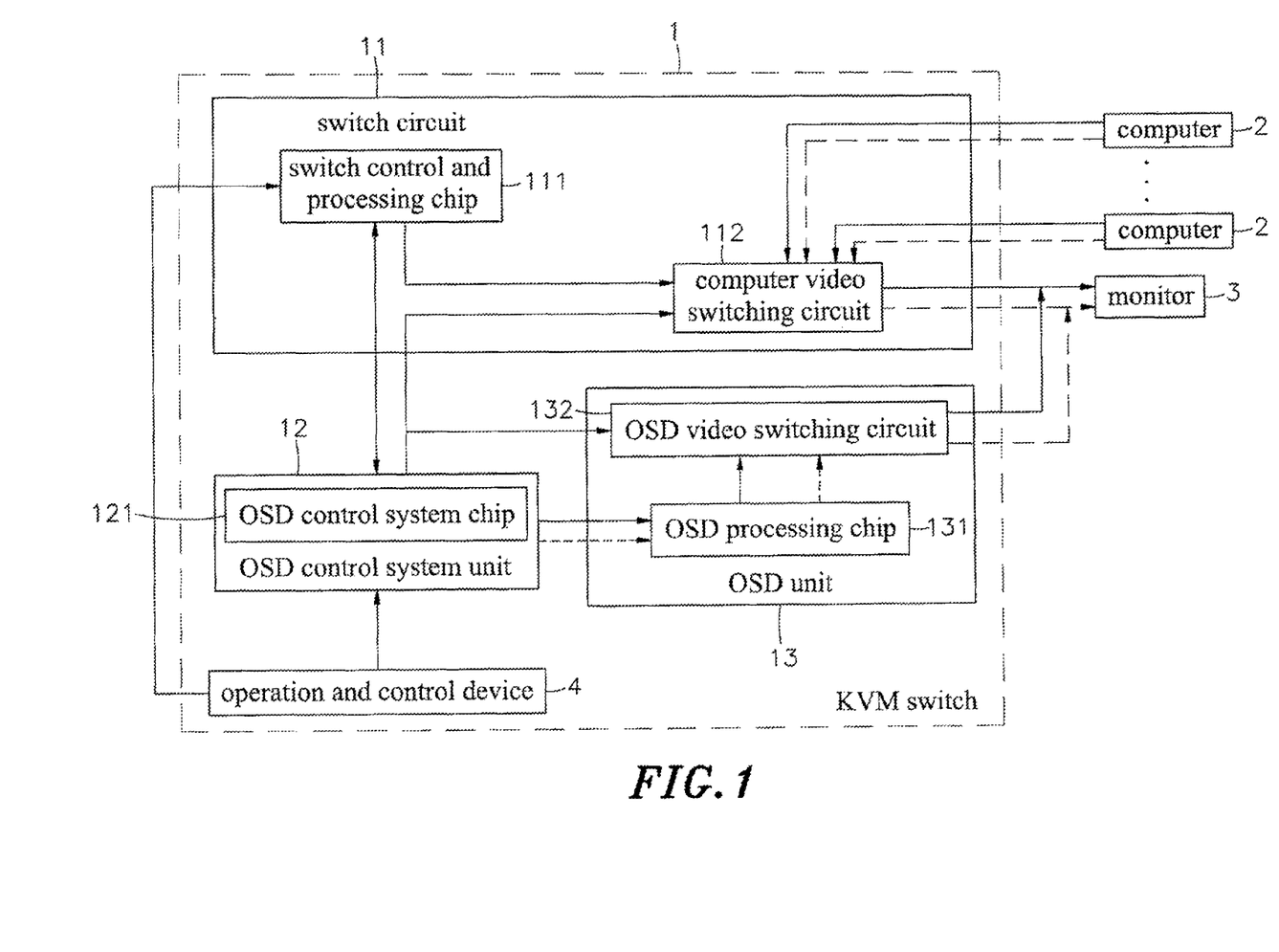
FIG. 1 is a block diagram of a KVM switch with independent on-screen display and control channels of the present invention.
Figure 2:
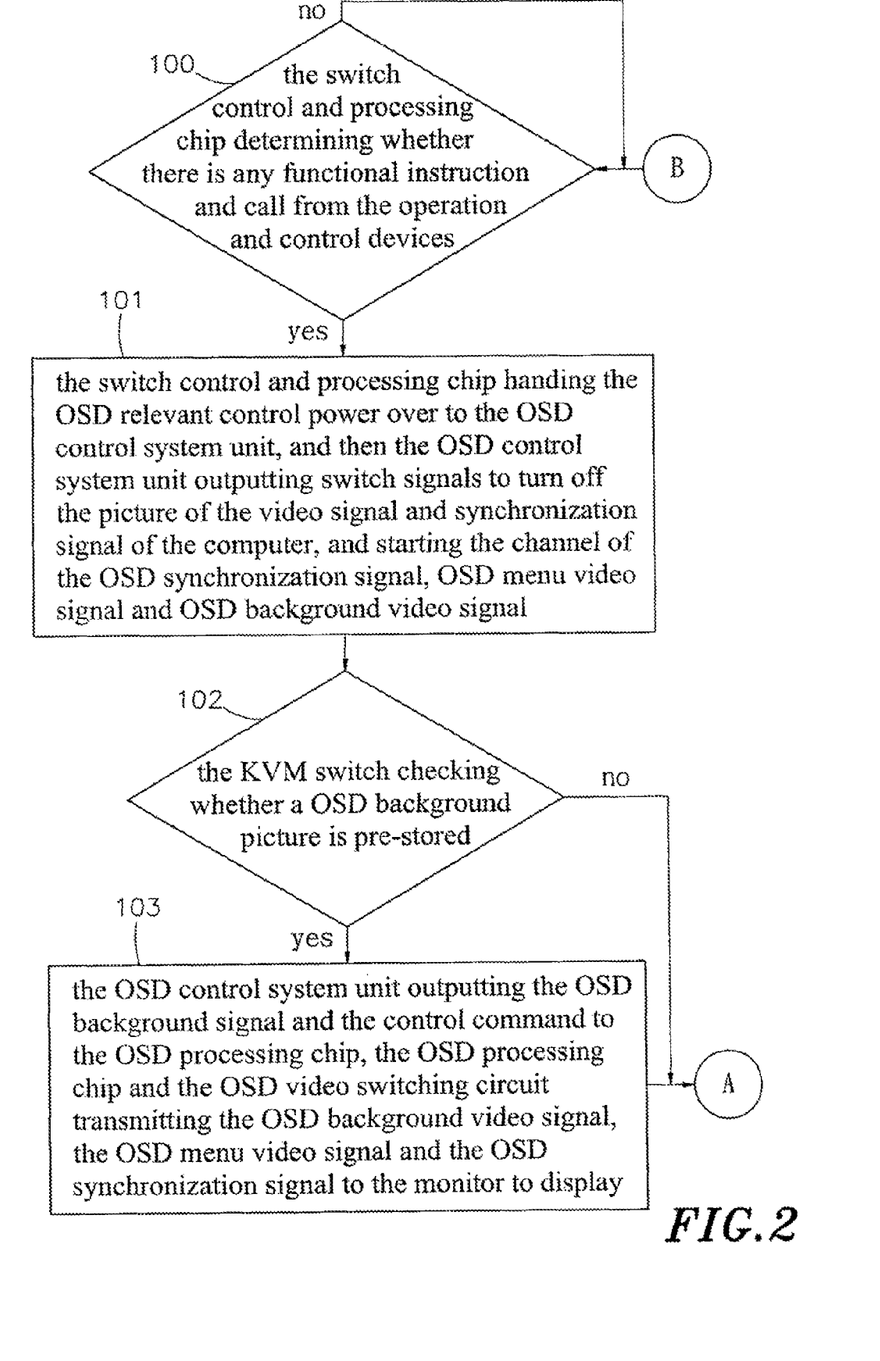
FIGS. 2 and 3 is a flowchart showing a series of steps of a method of operating the KVM switch according to a preferred embodiment of the present invention.
Figure 3:
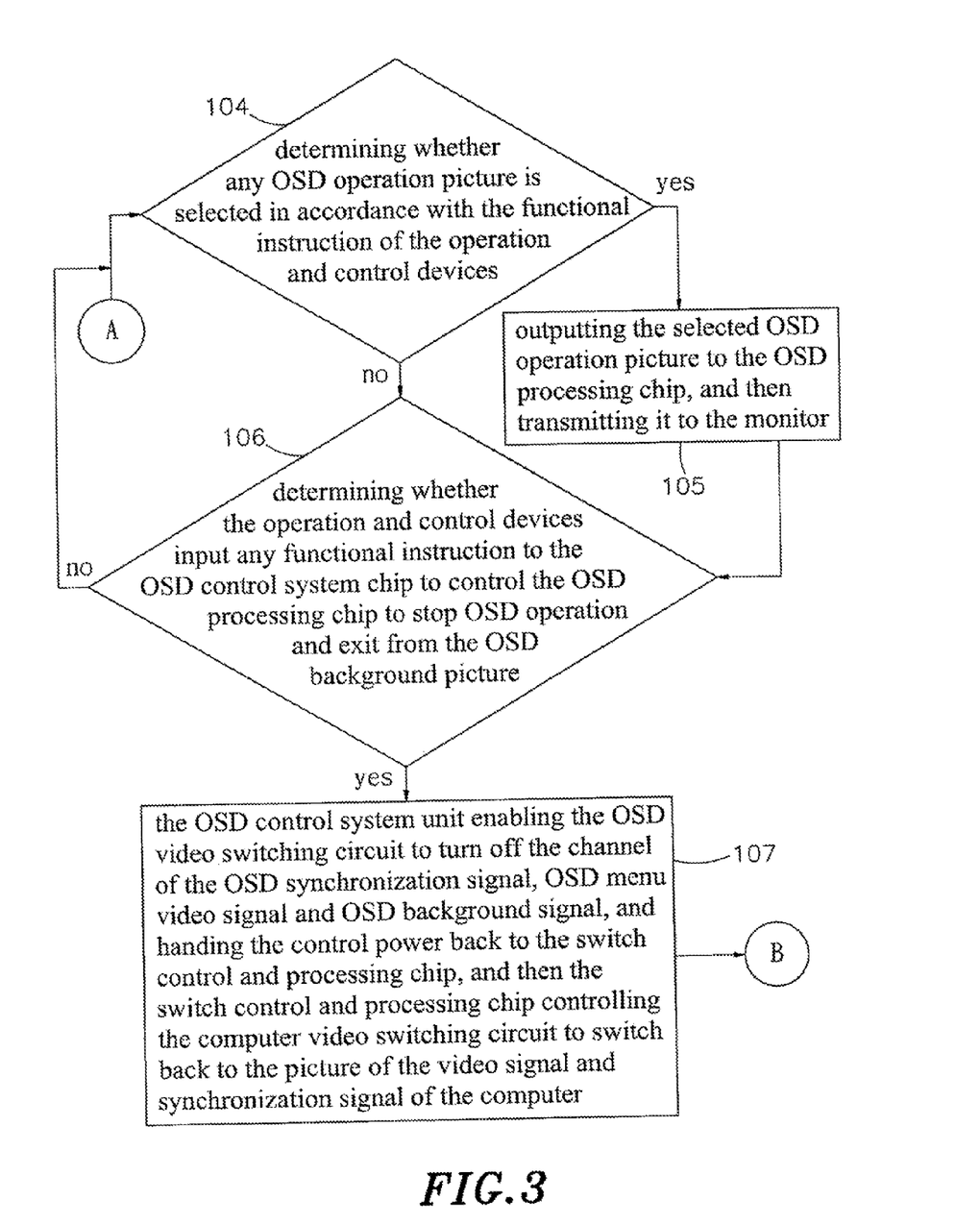

Refer to FIGS. 1, 2 and 3, FIG. 1 is a block diagram of a KVM switch with independent on-screen display and control channels and FIGS. 2 and 3 illustrate a flowchart showing a series of steps of a method of operating the KVM switch according to a preferred embodiment of the present invention. It can be seen clearly from the figure that the KVM switch 1 comprises a switch circuit 11 that is connected with a plurality of computers 2, and the switch circuit 11 comprises a switch control and processing chip 111 and a computer video switching circuit 112. The computer video switching circuit 112 can transmit signals to a monitor 3 and is connected to an OSD control system unit 12 that can receive signals from a plurality of operation and control devices 4. The OSD control system unit 12 has an OSD control system chip 121 which can be a single chip (MCU), an embedded system, or other system that can process the signals. The computer video switching circuit 112 and the OSD control system unit 12 are connected to an OSD unit 13. The OSD unit 13 comprises an OSD processing chip 131 and an OSD video switching circuit 132.

The computers 2 transmit video signals and synchronization signals to the switch circuit 11 which makes use of the switch control and processing chip 111 to calculate and process the video signal and synchronization signal from the selected computer. The computer video switching circuit 112 switches and receives the signals of the computers 2, and transmits the video signal and synchronization signal of the selected computer 2 to the monitor 3, so as to display the video signal of the computers 2.

Users rely on the operation and control devices 4 to give one or more functional instructions to the OSD control system unit 12, which converts the functional instruction into control command and then transmits it to the OSD unit 13. The control command is calculated and processed by the OSD processing chip 131, and switching signals are outputted to the computer video switching circuit 112 and the OSD video switching circuit 132. The output of the video signal and horizontal/vertical synchronization signal of the selected computer 2 is cut off and turned off. Meanwhile, the OSD processing chip 131 of the OSD unit 13 turns on the OSD video switching circuit 132, and outputs the OSD background video signal, the OSD menu video signal and the OSD horizontal/vertical synchronization signal. As the OSD unit 13 makes use of the internal OSD processing chip 131 to generate the OSD menu video signal and the OSD horizontal/vertical synchronization signal of fixed frequency, that constitute the display content which includes the OSD functions, and performs ON/OFF switch to the OSD background video signal, OSD menu video signal and OSD synchronization signal through the OSD video switching circuit 132, all these operations do not related to the video signals of the computers 2. When the switch circuit 11 is switched to any of the computers 2, the size and location of the OSD picture displayed on the monitor 3 are the same. This not only facilitates users to view, but also facilitate users to perform OSD operations by using the operation and control devices 4, such as mouse, touch screen, etc.

The operation and control devices 4 enable the OSD unit 13 to generate an OSD menu video signal and an OSD synchronization signal through the OSD control system unit 12. The OSD unit 13 then transmits the OSD menu video signal and OSD synchronization signal to the OSD video switching circuit 132. As the OSD picture does not overlap on the picture of the computers 2 connected to the computer video switching circuit 112 of the KVM switch 1, the OSD picture is not affected by the display settings of the computers 2. Therefore, the OSD picture has the fixed resolution, update frequency, font size, display location or other display settings, and users may adjust the display settings at their own discretion. Besides, as the OSD picture can be fully displayed on the monitor 3, the OSD functions can be set by using the mouse, touch screen and other devices.

The switch control and processing chip 111 of the switch circuit 11 processes and calculates video signal of the computers 2 only, and the OSD control system unit 12 and OSD unit 13 process and calculate the OSD functions separately. Therefore, the execution burden of the switch control and processing chip 111 is reduced, avoiding occupying the memories, hardware pins or other resources of the switch control and processing chip 111. The OSD control system unit 12 and OSD unit 13 can enable control functions of the OSD system to be strengthened and completed greatly. Moreover, the extendibility or online update of the OSD functions can be carried out with the OSD control system unit 12 and OSD unit 13.

As three different chips, namely, the switch control and processing chip 111, the OSD control system chip 121 and the OSD processing chip 131, are selected to transmit, calculate and process different signals, requiring fewer chip pins while strengthening calculation and processing functions, and due to cheap prices and low cost of these chips, the cost for the KVM switch 1 is reduced accordingly.

The method of operating the KVM switch 1 above to switch the channel for displaying of video signals comprises the following steps:

(100) the switch control and processing chip 111 of the switch circuit 11 of the KVM switch 1 determining whether there is any functional instructions and calls inputted from one or more operation and control devices 4; if there is any, proceed to step (101), and if there is no instruction or call, continue to wait for functional instruction from the operation and control devices 4 and repeat step (100);

(101) the switch control and processing chip 111 of the KVM switch 1 handing the OSD relevant control power over to the OSD control system unit 12, and then the OSD control system unit 12 outputting switch signals to turn off the picture of the video signal and synchronization signal of the computers 2 and starting the channel of the OSD synchronization signal, OSD menu video signal and OSD background video signal between the OSD video switching circuit 132 and the monitor 3;

(102) the KVM switch 1 checking whether a OSD background picture is pre-stored; if it is, proceed to step (103), and if it is not, proceed to step (104);

(103) the OSD control system unit 12 outputting the OSD background video signal of the pre-stored OSD background picture and the control command to the OSD processing chip 131 of the OSD unit 13, the OSD processing chip 131 and the OSD video switching circuit 132 of the OSD unit 13 transmitting the OSD background video signal, the OSD menu video signal, and OSD synchronization signal (horizontal/vertical) to the monitor 3 to display the OSD background video signal, OSD menu video signal and OSD synchronization signal;

(104) determining whether any OSD operation picture is selected in accordance with the functional instructions of the operation and control devices 4; if it is selected, proceed to step (105), and if it is not selected, proceed to step (106);

(105) outputting the selected OSD operation picture to the OSD processing chip 131, and then transmitting it to the monitor 3;

(106) determining whether the operation and control devices 4 input any functional instruction to the OSD control system chip 121 of the OSD control system unit 12 to control the OSD processing chip 131 to stop OSD operation and exit from the OSD background picture; if it does, proceed to step (107), and if it does not, proceed to step (104);

(107) the OSD control system unit 12 enabling the OSD video switching circuit 132 to turn off the channel of the OSD synchronization signal, the OSD menu video signal and the OSD background video signal, and handing the control power back to the switch control and processing chip 111 of the switch circuit 11 of the KVM switch 1, and then the switch control and processing chip 111 controlling the computer video switching circuit 112 to switch back to the picture of the video signal and synchronization signal of the computer 2.

Figure 4:
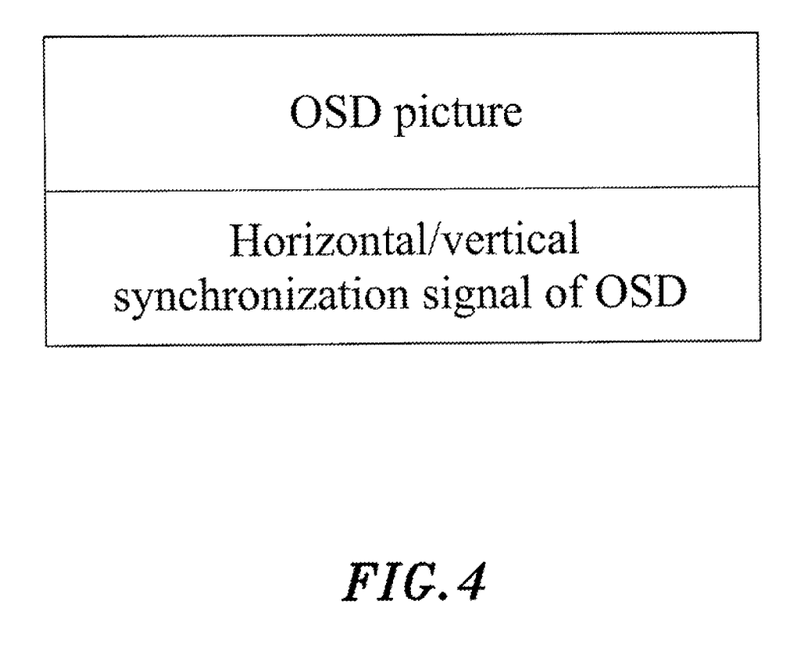
FIG. 4 is a schematic diagram (I) of the present invention in use.
Figure 5:
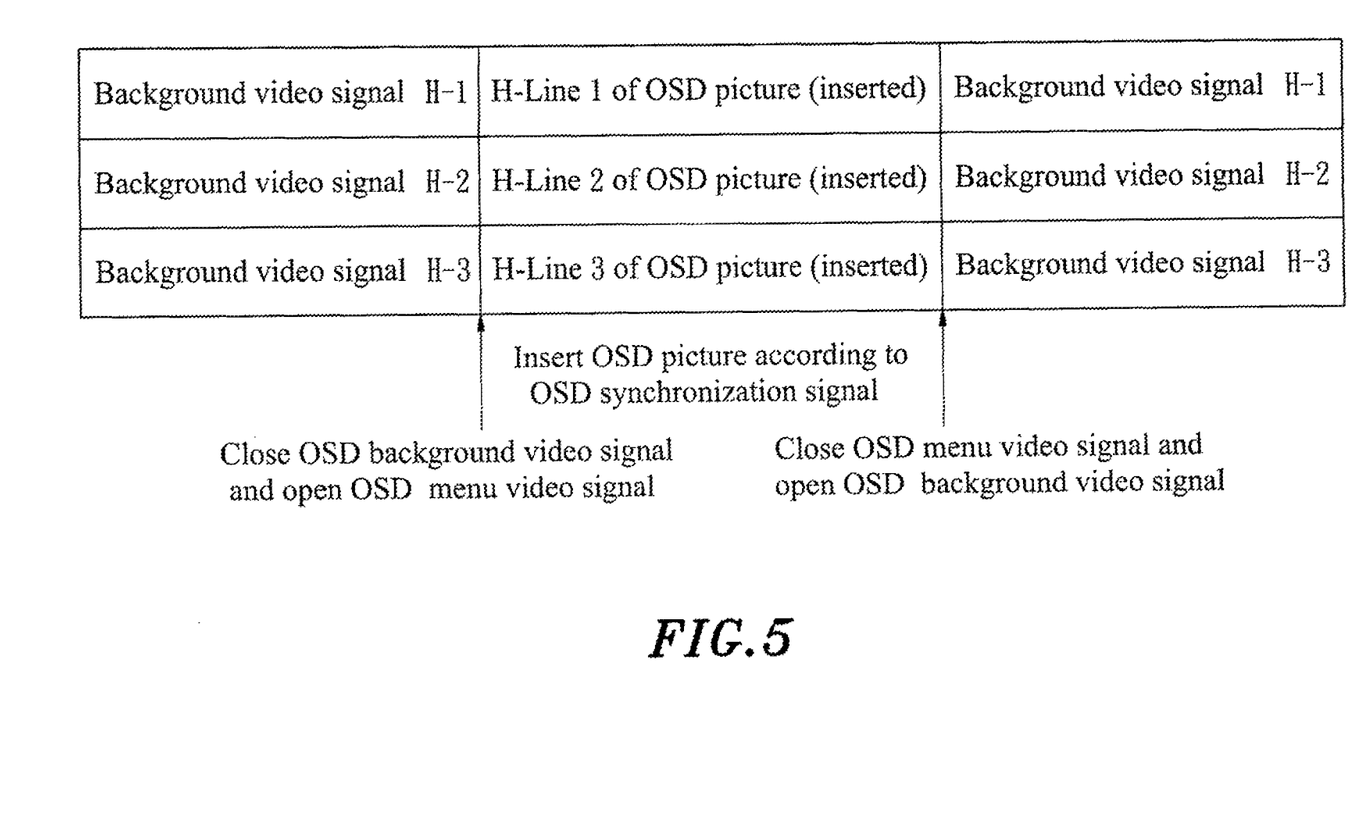
FIG. 5 is a schematic diagram (II) of the present invention in use.

Refer to FIGS. 1, 4 and 5, which are the block diagrams of the preferred embodiments of the present invention, the schematic diagram (I) of the present invention in use, and the schematic diagram (II) of the present invention in use. It can be seen clearly from these figures that when users make use of the operation and control devices 4 to turn on the OSD functions, and the OSD control system unit 12 outputs switching signal to the computer video switching circuit 112 so as to cut off and turn off the output of the video signal and the synchronization signal of the computers 2. And the OSD control system unit 12 controls the QSD processing chip 131 to generate the OSD menu video signal and the OSD synchronization signal of the display content including the OSD functions. The OSD processing chip 131 and the OSD video switching circuit 132 then transmit the OSD background video signal, OSD menu video signal and OSD synchronization signal to the monitor 3 which displays the OSD picture completely. The channel in which the OSD control system unit 12 transmits signals and the channel in which the computers 2 transmit the video signal cannot be communicated with each other for data transmission, and therefore the memories of the OSD control system unit 12 and the memories of the switch circuit 11 are used separately. When the operation and control devices 4 is used to perform OSD control, it will not influence the safety of the computers 2, and can further meet the IT security standards (such as the general standards EAL4 and EAL4+ of NIAP) and reach the requirements of human interface device and thus can be expanded. The KVM switch 1 can make a breakthrough in the general application scope and the sales market, and can be used in the network management and monitoring, government agencies, defense applications, or other locations and fields with highly secure confidential needs.

When the OSD functional operation is completed, users can make use of the operation and control devices 4 for giving instructions so as to enable the OSD control system unit 12 to output the switching signals again. The OSD video switching circuit 132 may interrupt and turn off the output of the OSD background video signal, the OSD menu video signal and OSD synchronization signal of the OSD unit 13 after receiving the switching signal. And the video signal and synchronization signal of the computers 2 are turned on for outputting. The monitor 3 then displays the picture of the computers 2.

The above-mentioned operation and control devices 4 may be a keyboard, mouse, touch screen, Bluetooth interface device, infrared interface device or other devices, provided that it enables the user to carries out operations. Therefore, it does not limit the patent claims of the present invention, namely, all modifications and equivalent structural changes made without departing from the essential scope thereof fall within the scope of the appended claims.

When in actual use, the device and method for KVM switch with independent On-screen display and control channels disclosed by the present invention can offer the following benefits:

(1) The OSD control system unit 12 converts the functional instruction to the control command so as to transmit it to the OSD unit 13 after receiving the functional instruction of the operation and control devices 4, so that the OSD background video signals, OSD menu video signal and OSD synchronization signals of the display content generated by the OSD unit 13 are transmitted to the OSD video switching circuit 132. The OSD control system unit 12 outputs the switch signal to the computer video switching circuit 112. The computer video switching circuit 112 then turns off the output of the video signal of the computers 2, and transmits the OSD background video signal, OSD menu video signal and OSD synchronization signal of the OSD unit 13 to the monitor 3 for displaying. For the video signal of the display content including the OSD functions is not related to video signal of the computers 2, the OSD picture have the fixed resolution, updated frequency, character size, display location or other display settings, which facilitates users to view or operate.

(2) The OSD control system unit 12 and OSD unit 13 process and calculate the OSD functions with the OSD control system chip 121 and the OSD processing chip 131 respectively, while the switch control processing chip 111 processes and calculates the video signal of the computers 2 alone. As the OSD functions do not occupy the memories of the switch control and processing chip 111, hardware pins or other resources, it can reduce the execution burden of the switch control and processing chip 111. The OSD control system unit 12 can further perform the random expansion or online update of the OSD functions, which not only strengthens the control function of the OSD system, but also completes its functions.

(3) The video signal and synchronization signal of the computers 2 are transmitted through the computer video switching circuit 112 of the switch circuit 11, and the OSD background video signal, OSD menu video signal and OSD synchronization signal are transmitted by the OSD video switching circuit 132 of the OSD unit 13. Hence, different channels are used for transmission of the computer signals and the OSD signals to the monitor 3. Also, the memories of the switching circuit 11 and the memories of the OSD control system unit 12 are separately used. When the OSD operation and control is performed using the operation and control devices 4, the signals will not be transmitted to the switch circuit 11 to influence the safety of the computers 2, so that the KVM switch 1 meets IT security standards and human interface device requirements, so as to further increase the application scope of the KVM switch 1.

Therefore, the invention mainly relates to the device and method for KVM switch with independent OSD display and control channels. The KVM switch 1 comprises a switch circuit 11, while the OSD control and processing chip 111 of the switch circuit 11 is connected with the computer video switching circuit 112 and the OSD control system unit 12. Signals of the computers 2 are transmitted to the computer video switching circuit 112 via the switch circuit 11. The operation and control devices 4 control the OSD control system unit 12 to generate the control commands and switching signals and to transmit them to the OSD unit 13. After the OSD menu video signal and OSD synchronization signal that are generated by the OSD processing chip 131 and the background video signal are transmitted to the OSD video switching circuit 132, the OSD video switching circuit 132 can perform ON/OFF switching to switch the OSD background video signal, OSD menu video signal and the OSD synchronization signal in accordance with the OSD processing chip 131, so that the OSD unit 13 transmits signals to the monitor 3 through the OSD video switching circuit 132. The displayed OSD picture can have fixed resolution, updating frequency, font size, display position or other display setting as the main protection, so that the size and the location of the OSD picture displayed in the monitor 3 are the same. And the OSD functions can be set by means of mouse, touch screen or other devices, and have the advantages of facilitating users to view and operate. However, the above descriptions are given only to illustrate one preferred embodiment of present invention and shall not be construed as limiting the patent scope of the present invention. It is hereby stated that all modifications and equivalent structural changes made without departing from the spirit and art of the present invention shall fall within the patent scope of the present invention.

In summary, the device and method for KVM switch with independent on-screen display and control channels as described above can really achieve its functions and objec- What the invention claimed is:

1. A method for operating a KVM switch with independent on-screen display (OSD) and control channels through at least one operation and control device, the KVM switch comprising a switch circuit, an OSD control system unit and an OSD unit, the switch circuit comprising a computer video switching circuit for receiving video signals and synchronization signals from a plurality of computers and a switch control and processing chip for receiving the video signals and synchronization signals from the computer video switching circuit and calculating, processing and transmitting the video signal and synchronization signal of the selected computer to the computer video switching circuit, the OSD control system unit comprising an OSD control system chip which receives at least one functional instruction from the operation and control devices, converts the functional instruction to control command and transmits the control command to the switch circuit and the OSD unit, the OSD unit comprising an OSD video switching circuit and an OSD processing chip, the OSD processing chip receiving the control command and a background video signal from the OSD control system unit, calculating, processing and generating an OSD synchronization signal and an OSD menu video signal, and transmitting the OSD synchronization signal, the OSD image signal and the OSD background image signal to the OSD video switching circuit, the OSD video switching circuit performing the ON and OFF switching processing for the output of the OSD synchronization signal, an OSD menu video signal and OSD background video signal for displaying at a monitor, the method comprising the steps of:

(a) the switch control and processing chip of the switch circuit of the KVM switch receiving a functional instruction or call from the operation and control device;

(b) the switch control and processing chip of the KVM switch handing the OSD relevant control power over to the OSD control system unit, and then the OSD control system unit outputting switch signals to turn off the picture of the video signal and synchronization signal of the selected computer and starting the channel for OSD synchronization signal, OSD menu video signal and OSD background video signal;

(c) the OSD control system unit of the KVM switch retrieving a pre-stored OSD background picture;

(d) the OSD control system unit outputting the pre-stored OSD background video signal and the control command to the OSD processing chip of the OSD unit, and the OSD processing chip and the OSD video switching circuit transmitting the OSD background video signal, the OSD menu video signal and the OSD synchronization signal to the monitor for displaying;

(e) the operation and control device inputting a functional instruction to select an OSD operation picture;

(f) outputting the selected OSD operating picture to the OSD processing chip, and then transmitting it to the monitor;

(g) the operation and control device inputting a functional instruction to the OSD control system chip of the OSD control system unit to control the OSD processing chip to stop the OSD operation and exit from the OSD background picture;

(h) the OSD control system unit enabling the OSD video switching circuit to turn off the channel of the OSD synchronization signal, the OSD menu video signal and the OSD background video signal; and handing the control power back to the switch control and processing chip of the switch circuit of the KVM switch, and then the switch control and processing chip controlling the computer video switching circuit to switch back to the picture of the video signal and synchronization signal of the computer.

2. The method according to claim 1, wherein the switch control and processing chip of the switch circuit is a single chip (MCU) or a CPU.

3. The method according to claim 1, wherein the OSA control system chip of the OSD control system unit is a single chip (MCU), an embedded system, or other systems that can process the signals.

4. The method according to claim 1, wherein the OSD processing chip of the OSD unit is a circuit which generates the OSD video signal and the vertical/horizontal OSD synchronization signal at a fixed rate.

5. The method according to claim 1, wherein the operation and control device is a keyboard, mouse, touch screen, Bluetooth interface device, infrared interface device or other devices.

6. The according to claim 1, wherein the OSD menu video signal and the OSD synchronization signal generated by the OSD unit has a fixed resolution, updated frequency, character size, display location or other display settings.

7. The method according to claim 1, wherein if no functional instruction or call is received in step (a), the OSD control system chip continues to wait for functional instruction from the operation and control devices.

8. The method according to claim 1, wherein if no OSD background picture there is no pre-stored background picture in step (c), the OSD control system chip determines if the operation and control device inputs a functional instruction to select an OSD operation picture.

9. The method according to claim 1, wherein if no OSD operation picture is selected in step (e), the OSD control system chip determines if the operation and control device inputs a functional instruction to stop the OSD operation and exit from the OSD background picture.

10. The method according to claim 1, wherein if no functional instruction is inputted by the operation and control device to stop the OSD operation in step (g), the OSD control system chip determines if the operation and control device inputs a functional instruction to select an OSD operation picture.

* * * * *